(12) United States Patent
Sui et al.

(10) Patent No.: US 12,432,533 B2
(45) Date of Patent: Sep. 30, 2025

(54) VEHICLE LEVEL COMMUNICATION METHOD AND APPARATUS

(71) Applicant: SHENZHEN YINWANG INTELLIGENT TECHNOLOGIES CO., LTD., Shenzhen (CN)

(72) Inventors: Linlin Sui, Beijing (CN); Miao Yang, Beijing (CN); Mingchao Li, Beijing (CN); Yong Wu, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 104 days.

(21) Appl. No.: 18/471,686

(22) Filed: Sep. 21, 2023

(65) Prior Publication Data
US 2024/0015488 A1    Jan. 11, 2024

Related U.S. Application Data

(63) Continuation of application No. PCT/CN2022/079916, filed on Mar. 9, 2022.

(30) Foreign Application Priority Data

Mar. 27, 2021 (CN) .......................... 202110329130.X

(51) Int. Cl.
*H04W 4/46* (2018.01)
*G01C 21/34* (2006.01)
(Continued)

(52) U.S. Cl.
CPC .............. *H04W 4/46* (2018.02); *G01C 21/34* (2013.01); *G01S 19/42* (2013.01); *H04W 4/029* (2018.02); *H04W 4/44* (2018.02)

(58) Field of Classification Search
CPC ......... H04W 4/46; H04W 4/44; H04W 4/029; G01S 19/42; G01C 21/30; G08G 1/16
See application file for complete search history.

(56) References Cited

U.S. PATENT DOCUMENTS

| | | | | |
|---|---|---|---|---|
| 8,295,257 | B2 * | 10/2012 | Chen | G08G 1/22 370/338 |
| 8,923,147 | B2 * | 12/2014 | Krishnaswamy | H04W 56/0035 370/252 |

(Continued)

FOREIGN PATENT DOCUMENTS

| CN | 109034780 A | 12/2018 |
|---|---|---|
| CN | 109791565 A | 5/2019 |

(Continued)

OTHER PUBLICATIONS

International Search Report and Written Opinion in International Appln. No. PCT/CN2022/079916, mailed on May 19, 2022, 22 pages (with English translation).

(Continued)

*Primary Examiner* — John A Tweel, Jr.
(74) *Attorney, Agent, or Firm* — Fish & Richardson P.C.

(57) ABSTRACT

The present disclosure relates to vehicle-mounted devices and communication method. One example vehicle-mounted device in a first vehicle may obtain first position information, where the first position information indicates a position of the first vehicle. The vehicle-mounted device generates first-level information based on the first position information, where the first-level information indicates a first height level to which the position of the first vehicle belongs or a first height level to which a future driving track of the first vehicle belongs, and sends the first-level information.

20 Claims, 6 Drawing Sheets

(51) Int. Cl.
  *G01S 19/42* (2010.01)
  *H04W 4/029* (2018.01)
  *H04W 4/44* (2018.01)

(56) References Cited

U.S. PATENT DOCUMENTS

| 8,935,086 B2 * | 1/2015 | Sadekar | G08G 1/16 |
| | | | 701/301 |
| 10,325,498 B2 * | 6/2019 | Zhang | H04L 65/40 |

FOREIGN PATENT DOCUMENTS

| CN | 114079880 A | 2/2022 |
| WO | 2015196359 A1 | 12/2015 |

OTHER PUBLICATIONS

Extended European Search Report in European Appln. No. 22778506.0, mailed on Sep. 6, 2024, 7 pages.

* cited by examiner

VEHICLE LEVEL COMMUNICATION METHOD AND APPARATUS

CROSS-REFERENCE TO RELATED APPLICATIONS

This application is a continuation of International Application No. PCT/CN2022/079916, filed on Mar. 9, 2022, which claims priority to Chinese Patent Application No. 202110329130.X, filed on Mar. 27, 2021. The disclosures of the aforementioned applications are hereby incorporated by reference in their entireties.

TECHNICAL FIELD

This application relates to the field of vehicle-to-everything technologies, and in particular, to a communication method and a communication apparatus.

BACKGROUND

Currently, map data of an electronic map is key information for implementing services such as auxiliary navigation and autonomous driving. In vehicle-to-everything (vehicle-to-everything, V2X) communication, a vehicle may send position information to another device to implement various services. For example, longitude and latitude coordinate information may be exchanged between different vehicles.

Elevation data is a type of information indicating an altitude of a position. For the sake of elevation data security, related laws and regulations have strict confidentiality requirements on map content or position information exchanged between different devices. It is stipulated that electronic navigation maps are prohibited to collect elevation points, contour lines, and digital elevation models, and are prohibited to express explicit elevation data. Therefore, there is a lack of elevation data in the map data and the position information exchanged between different vehicles.

As shown in FIG. 1, in a scenario with a multi-level road, such as a viaduct or an overpass, there are parallel roads in the multi-level road, for example, roads with a consistent up-down direction or a consistent left-right direction (within a precision error range). When vehicles at different levels perform V2X communication, because there is no elevation data in an exchanged V2X information set, a vehicle incorrectly considers that another vehicle in communication is at a same road level. In this case, a misoperation is caused, and a serious security risk exists.

SUMMARY

Embodiments of this application provide a communication method and a communication apparatus, to help avoid misoperations between different vehicles in a scenario with a multi-layer road.

According to a first aspect, an embodiment of this application provides a communication method. The method may be applied to a first vehicle-mounted device in a first vehicle. The first vehicle-mounted device may be the first vehicle, or the first vehicle-mounted device may be any communication device in the first vehicle.

In the method, the first vehicle-mounted device may be configured to: obtain first position information, where the first position information indicates a position of the first vehicle; generate first-level information based on the first position information, where the first-level information indicates a first height level to which the position of the first vehicle belongs, or indicates a first height level to which a future driving track of the first vehicle belongs; and send the first-level information.

According to this solution, the first vehicle-mounted device may generate and send the first-level information indicating the first height level, so that another vehicle (for example, a second vehicle) can learn, after receiving the first-level information, the first height level to which the first vehicle currently belongs or is about to belong. Therefore, in a multi-level road (such as a viaduct and an overpass) scenario, when elevation data cannot be expressed or elevation data cannot be directly transmitted, the first-level information is used as elevation data that can be referred to. It is convenient for another vehicle to predict a danger in advance based on the first-level information, and further determine whether processing such as vehicle avoidance needs to be performed, so as to avoid safety risks caused by misoperations between vehicles at different height levels.

It should be understood that, for ease of differentiation, in this application, the position of the first vehicle may be referred to as a first position. The first position information may be information indicating a real-time position of the first vehicle. Alternatively, the first position information may be prediction information indicating a future position to which the first vehicle is about to travel. Alternatively, the first position information may be position information that has a set correspondence with the first position of the first vehicle, for example, a road point, a road segment, or a lane in which the first vehicle is located. This is not limited in this application. Correspondingly, the first vehicle-mounted device may generate the first-level information in any proper manner based on the first position information. When information included in the first position information is different or the first position information is obtained in different manners, or the like, specific implementations of generating the first-level information based on the first position information may also be different. For example, this application may have the following implementations.

Example 1: The first vehicle-mounted device may generate the first-level information based on map information.

The first position information may include at least one of the following map information: road level indication information, a road point identifier, a road section identifier, or a lane identifier. That the first vehicle-mounted device generates first-level information based on the first position information includes: generating the first height level based on the map information; and adding the first height level to the first-level information.

It may be understood that the first position information may be received by the first vehicle-mounted device from a road side unit, and the first position information may be included in a map (MAP) message sent by the RSU. Alternatively, the first position information may be obtained by the first vehicle-mounted device from a related position detection device (for example, a global navigation satellite system of the first vehicle or another detection device). The first vehicle-mounted device may use the map information such as the road level indication information, the road point identifier, the road section identifier, or the lane identifier as the first height level. Alternatively, the first height level may be generated after corresponding conversion processing is performed on the map information such as the road level indication information, the road point identifier, the road section identifier, or the lane identifier. A manner of obtaining the first height level is not limited in this application.

Therefore, the first vehicle-mounted device in the first vehicle may receive, from the RSU, the map information indicating a map feature, so as to add the corresponding road level identifier, the road point identifier, the road section identifier, the lane identifier, and the like to the first-level information that is sent outwards. In this way, another vehicle predicts a danger in advance based on the first-level information, and further determines whether processing such as vehicle avoidance needs to be performed, so as to avoid safety risks caused by misoperations between vehicles at different height levels.

Example 2: The first vehicle-mounted device generates the first-level information based on height coordinates of the position of the first vehicle.

The first position information includes the height coordinates of the position of the first vehicle. The generating first-level information based on the first position information includes: converting the height coordinates into the first height level; and adding the first height level to the first-level information.

It may be understood that the first vehicle-mounted device may obtain the height coordinates by using a global navigation satellite system GNSS or a height sensor. Optionally, the first vehicle-mounted device may obtain second-level configuration information, and the second-level configuration information may indicate a correspondence between a height interval and a height level. The first vehicle-mounted device may determine the height interval to which the height coordinates belong, and then determine, based on the second-level configuration information, the first height level corresponding to the height coordinates. A manner of obtaining the first height level is not limited in this application.

Therefore, the first vehicle-mounted device in the first vehicle may obtain the height coordinates of the position of the first vehicle by using the GNSS or the height sensor, and obtain, after conversion processing is performed on the height coordinates, the height level that can be used to represent the height coordinates. In this way, the height level obtained by the first vehicle-mounted device through conversion may be used as reference height data and sent. When the height data cannot be exchanged, the another vehicle uses the height level as a reference to predict a danger in advance, and further determines whether processing such as vehicle avoidance needs to be performed, so as to avoid safety risks caused by misoperations between vehicles at different height levels.

Example 3: The first vehicle-mounted device generates the first-level information based on longitude and latitude information of the position of the first vehicle.

The first position information includes the longitude and latitude information of the position of the first vehicle. The method further includes: obtaining a correspondence between a road or a lane on a map and a longitude and a latitude. The generating first-level information based on the first position information includes: determining, based on the longitude and latitude information and the correspondence, a road identifier or a lane identifier corresponding to the position of the first vehicle; and adding the road identifier or the lane identifier to the first-level information.

Therefore, the longitude and latitude information may be replaced by the first vehicle-mounted device in the first vehicle with the road identifier or the lane identifier and sent, so that after receiving the road identifier or the lane identifier, the another vehicle may learn of the road or lane on which the first vehicle is located. It is convenient for the another vehicle to determine, based on the road or the lane in which the first vehicle is located, whether processing such as vehicle avoidance needs to be performed, so as to avoid safety risks caused by misoperations between vehicles at different height levels.

Optionally, the generating first-level information based on the first position information includes: obtaining first-level configuration information and second-level configuration information, where the first-level configuration information indicates a correspondence between map information and a height level, and the second-level configuration information indicates a correspondence between a height interval and a height level. The first vehicle-mounted device may determine, based on the first-level configuration information, that a height level corresponding to the map information is a first candidate height level; determine, based on the second-level configuration information, that a height level corresponding to the height coordinates is second candidate height level information; when the first candidate height level is the same as the second candidate height level, determine that the first candidate height level and the second candidate height level are the first height level; and when the first candidate height level is different from the second candidate height level, determine that the first candidate height level or the second candidate height level is the first height level.

Based on the foregoing example, in a possible design, the sending the first-level information includes: sending the first-level information to another vehicle, or sending the first-level information in a broadcast manner. In a possible design, the first-level information is a basic safety message BSM. Therefore, the first vehicle-mounted device may transmit the first-level information in any proper manner according to a requirement, so that the another vehicle can receive the first-level information and learn of the first height level to which the first vehicle belongs.

In a possible design, the method further includes: receiving second-level information from a second vehicle, where the second-level information indicates a second height level to which a position of the second vehicle belongs, or indicates a second height level to which a future driving track of the second vehicle belongs; and when the first height level is different from the second height level, determining not to avoid the second vehicle during route planning. Therefore, when the first vehicle and the second vehicle respectively travel on parallel sections or cross sections of roads at different levels, the first vehicle does not need to worry that the second vehicle may cause adverse impact (for example, collision) on driving of the first vehicle.

According to a second aspect, an embodiment of this application provides a communication apparatus. The apparatus may include: an information obtaining unit, configured to obtain first position information, where the first position information indicates a position of a first vehicle; a processing unit, configured to generate first-level information based on the first position information, where the first-level information indicates a first height level to which the position of the first vehicle belongs, or indicates a first height level to which a future driving track of the first vehicle belongs; and a communication unit, configured to send the first-level information.

In an example, the first position information includes at least one of the following map information: road level indication information, a road point identifier, a road section identifier, or a lane identifier. The processing unit is specifically configured to generate the first height level based on the map information; and add the first height level to the first-level information. The information obtaining unit is configured to receive the first position information from a road side unit by using the communication unit.

In an example, the first position information includes height coordinates of the position of the first vehicle. The processing unit is specifically configured to convert the height coordinates into the first height level; and add the first height level to the first-level information. Optionally, the information obtaining unit is configured to obtain the height coordinates by using a global navigation satellite system GNSS or a height sensor.

In an example, the first position information includes longitude and latitude information of the position of the first vehicle. The information obtaining unit is further configured to obtain a correspondence between a road or a lane on a map and a longitude and a latitude. The processing unit is specifically configured to determine, based on the longitude and latitude information and the correspondence, a road identifier or a lane identifier corresponding to the position of the first vehicle; and add the road identifier or the lane identifier to the first-level information.

Optionally, the generating first-level information based on the first position information includes: obtaining first-level configuration information and second-level configuration information, where the first-level configuration information indicates a correspondence between map information and a height level, and the second-level configuration information indicates a correspondence between a height interval and a height level. The first vehicle-mounted device may determine, based on the first-level configuration information, that a height level corresponding to the map information is a first candidate height level; determine, based on the second-level configuration information, that a height level corresponding to the height coordinates is second candidate height level information; when the first candidate height level is the same as the second candidate height level, determine that the first candidate height level and the second candidate height level are the first height level; and when the first candidate height level is different from the second candidate height level, determine that the first candidate height level or the second candidate height level is the first height level.

In a possible design, the communication unit is configured to send the first-level information to another vehicle; and send the first-level information in a broadcast manner.

In a possible design, the first-level information is a basic safety message BSM.

In a possible design, the communication unit is further configured to receive second-level information from a second vehicle, where the second-level information indicates a second height level to which a position of the second vehicle belongs, or indicates a second height level to which a future driving track of the second vehicle belongs; and when the first height level is different from the second height level, determine not to avoid the second vehicle during route planning.

According to a third aspect, an embodiment of this application provides a communication device, including a memory and a processor, where the memory is configured to store computer instructions; and the processor invokes the computer instructions, to implement the method according to any one of the first aspect.

According to a fourth aspect, an embodiment of this application further provides a computer-readable storage medium, where the computer-readable storage medium stores a computer program, and when the computer program runs on a processor, the method according to any one of the first aspect is implemented.

According to a fifth aspect, an embodiment of this application further provides a computer program product. When the computer program product runs on a processor, the method according to any one of the first aspect is implemented.

In this application, based on the implementations provided in the foregoing aspects, the implementations may be further combined to provide more implementations.

DESCRIPTION OF EMBODIMENTS

Figure 1:
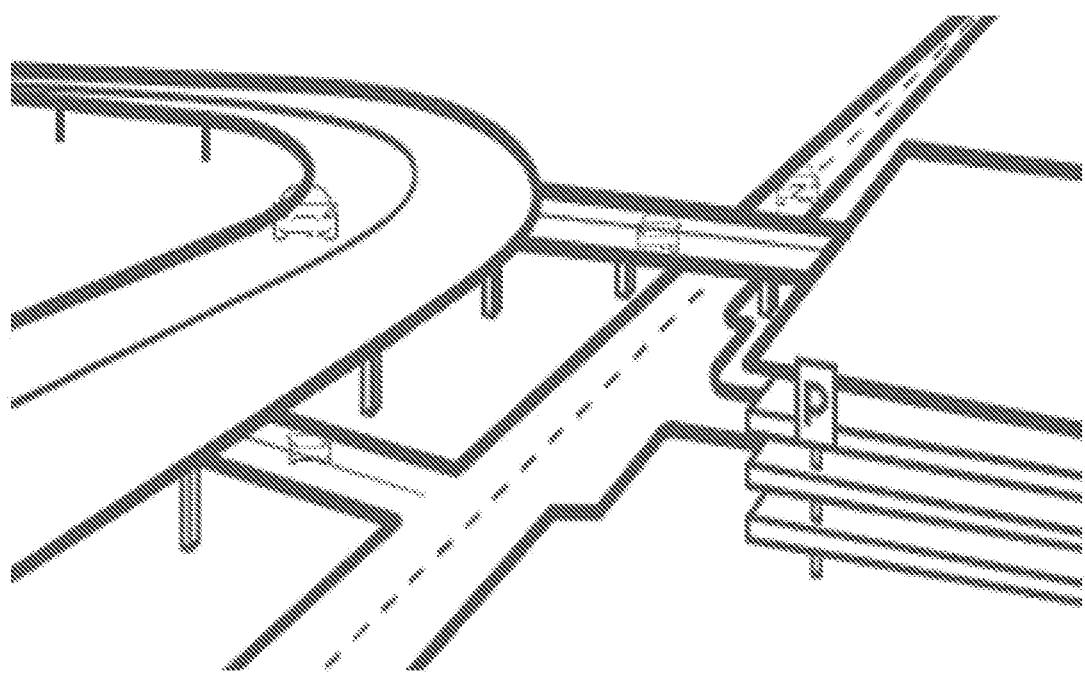
FIG. 1 is a schematic diagram of a multi-level road.

In the following, some terms in this application are described, so as to help persons skilled in the art have a better understanding.

(1) Vehicle-mounted device is a device placed or installed on a vehicle for information processing and information interaction. The vehicle-mounted device in this embodiment of this application is a device with a communication capability. For example, a vehicle-mounted device is a telematics box (telematics box, T-Box), and is generally installed on the vehicle, and a road side unit (road side unit, RSU) is installed on a roadside, and the T-Box may communicate with the RSU.

Alternatively, various terminal devices described below may be considered as vehicle-mounted devices if the terminal devices are located on a vehicle. (For example, the terminal devices are placed in the vehicle or mounted in the vehicle.) The vehicle-mounted device may alternatively be considered as an on board unit (on board unit, OBU).

The terminal device includes a device that provides a user with voice and/or data connectivity, for example, may include a handheld device with a wireless connection function, or a processing device connected to a wireless modem. The terminal device may communicate with a core network through a radio access network (radio access network, RAN), and exchange a voice and/or data with the RAN. The terminal device may be user equipment (user equipment, UE), a wireless terminal device, a mobile terminal device, a device-to-device (device-to-device, D2D) communication terminal device, a V2X terminal device, a machine-to-machine/machine-type communication (machine-to-machine/machine-type communication, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, hand-held, or computer built-in mobile apparatus. For example, the terminal device may be a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device may alternatively include a limited device, for example, a device with low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

(2) Vehicle-to-everything (vehicle to X, V2X) communication is a key technology of future intelligent transportation systems, including vehicle to vehicle (vehicle to vehicle, V2V) communication, vehicle to pedestrian (vehicle to pedestrian, V2P) communication/P2V communication, pedestrian to pedestrian (pedestrian to pedestrian, P2P) communication, vehicle to road side unit (vehicle to road side unit, V2 (RSU), also known as V2I) communication, or the like. The vehicle-to-everything communication covers PC5 communication (also referred to as PC5 interface communication, communication on a PC5 interface, and the like) and Uu communication (also referred to as Uu interface communication, communication on a Uu interface, and the like). For example, some V2X services of a vehicle-mounted device may be communicated with a V2X server (server) through a Uu interface, and some V2X services may be directly communicated with another vehicle-mounted device through a PC5 interface. Uu communication and PC5 communication may be performed in different frequency bands, or may be performed simultaneously.

In embodiments of this application, PC5 communication of the V2X service means that two vehicle-mounted devices directly send and receive data (or a V2X message) of the V2X service through the PC5 interface. For example, when PC5 communication of the V2X service is performed between the first vehicle-mounted device and the second vehicle-mounted device, the first vehicle-mounted device sends the data of the V2X service to the second vehicle-mounted device on the PC5 interface. The second vehicle-mounted device receives, on the PC5 interface, the data that is of the V2X service and that is sent by the first vehicle-mounted device.

The vehicle-mounted device may obtain road condition information or receive information in time by using V2X communication. Most common V2V and V2I are used as examples: A vehicle may broadcast information such as a speed, a driving direction, a specific position, and whether an emergency brake is stepped on to a surrounding vehicle through V2V communication, and the surrounding vehicle obtains the information, so that a driver can better perceive a traffic condition beyond a line-of-sight distance, to predict a danger in advance and perform avoidance in time. For V2I communication, in addition to interaction of the foregoing safety information, a roadside infrastructure may further provide various service information, data network accesses, and the like for the vehicle, and functions such as electronic toll collection and intra-vehicle entertainment can greatly improve traffic intelligence.

(3) The PC5 interface is a direct communication interface between a terminal device (for example, a vehicle-mounted device) and a terminal device. Data transmission may be performed between neighboring terminals within an effective communication range of the PC5 by using a direct link, and forwarding does not need to be performed by using a central node (for example, a base station), and information transmission does not need to be performed by using a conventional cellular link. Therefore, communication is fast and convenient. Direct link communication between vehicle-mounted devices in the V2X is also performed through the PC5 interface.

(4) A global navigation satellite system (global navigation satellite system, GNSS) generally includes a global positioning system (global positioning system, GPS), a BeiDou navigation satellite system (BeiDou navigation satellite system, BDS), a global navigation satellite system (global navigation satellite system, GLONASS), a Galileo satellite navigation system (Galileo satellite navigation system, Galileo), or the like. The GNSS system can provide precise positioning, navigation, and timing services. As a high-precision clock source, the GNSS can reach a microsecond level.

Figure 2:
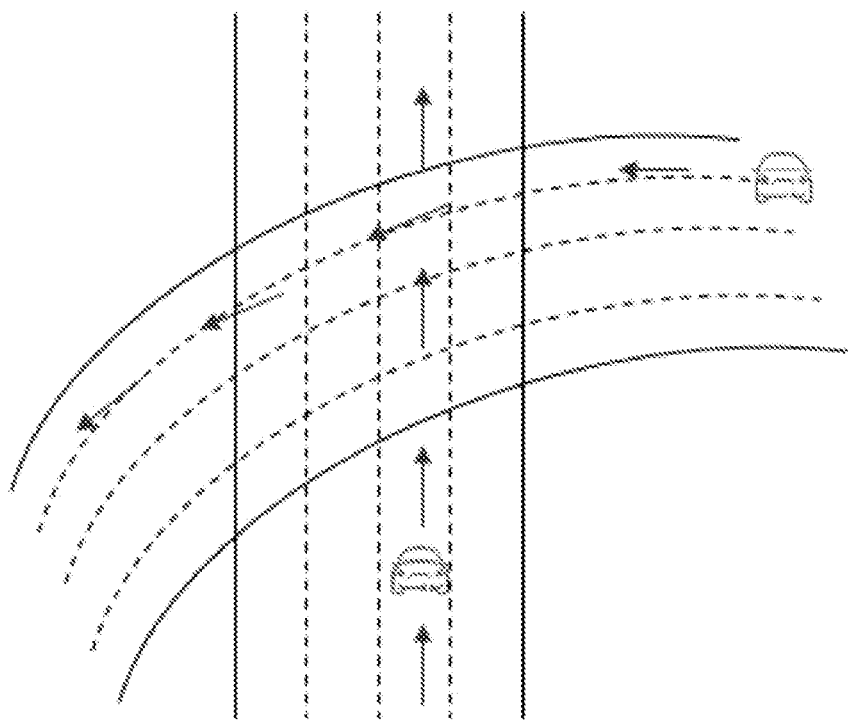
FIG. 2 is a schematic diagram of a vehicle driving on roads at different levels.

(5) Multi-level road, also known as a multi-story interchange (multi-story interchange) road, refers to an interchange or overlap of intersecting roads with two or more planes, and straight and left-turn carriageways of the intersecting roads are arranged on different planes in layers by using bridge structures. Refer to FIG. 1 and FIG. 2.

(6) Lane, also known as a driving line and a carriageway, is used for vehicles to pass through a road. The lane is set on general highways and expressways. Based on functions, the following lane classifications can be included: a main lane, a carriageway, an overtaking lane, a center lane, an outer-center lane, an inner-center lane, an acceleration lane, a deceleration lane, an auxiliary lane, or the like. A position point in any lane may be referred to as a road point.

(7) A section, in the transportation field, is a traffic line between two adjacent nodes on a traffic network, and may include a series of road points. An orderly arrangement of a series of connected sections is called a route.

(8) A driving track is a route through which a vehicle moves in space. Generally, the driving track is constructed based on position information related to vehicle movement. It should be understood that, in some embodiments of this application, the driving track may further include a prediction of a future driving track of the vehicle.

It should be noted that the terms "system" and "network" may be used interchangeably in embodiments of this application. The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects. Words such as "first" and "second" are merely used for distinction and description, and shall not be understood as an indication or implication of relative importance or an indication or implication of an order. "A plurality of" refers to two or more than two.

To better understand the technical solutions provided in embodiments of this application, the following first describes the technical background of embodiments of this application.

Map data of an electronic map is key information for implementing services such as auxiliary navigation and autonomous driving. In V2X communication, a vehicle may further obtain road condition information or receive other information in time by using the V2X communication, to better perform a traffic service such as route planning and providing a driving risk warning for manual driving. Elevation data is a type of information indicating an altitude of a position. For the sake of elevation data security, related laws and regulations have strict confidentiality requirements on map content or position information exchanged between different devices. It is stipulated that electronic navigation maps are prohibited to collect elevation points, contour lines, and digital elevation models, and are prohibited to express explicit elevation data. Therefore, there is a lack of elevation data in the map data and the position information exchanged between different vehicles.

In a manual driving mode, a vehicle usually determines a specific passing direction and a road track based on a road topology track composed of a driving track line. In an autonomous driving mode, a vehicle automatically plans a driving route based on different destinations by using electronic navigation map information. When a global navigation satellite system (global navigation satellite system, GNSS) and a geographic information system (geographic information system, GIS) are installed on a vehicle, an electronic map system is obtained through integrated application of the GNSS and the GIS, so as to implement vehicle tracking and positioning. If the electronic map system is installed on the vehicle and the vehicle is in an area in which an electronic map service is enabled, a map of an area in which the vehicle is located and an actual position of the vehicle on the map are displayed on a display in the vehicle.

However, in a multi-level road environment such as a viaduct and an overpass shown in FIG. 1 and FIG. 2, there are parallel roads in the multi-level road, for example, roads with a consistent up-down direction or a consistent left-right direction (within a precision error range). When vehicles located at different road levels perform route planning and/or V2X communication based on obtained map data, road condition information or other interaction information, because there is a lack of elevation data in the map data and position information exchanged between different vehicles, a vehicle cannot accurately determine whether the vehicle is at a same road level as another vehicle, and therefore may make an incorrect prediction result when predicting a danger in advance. This results in incorrect warning information and a series of safety problems.

In view of this, embodiments of this application provide a communication method and a communication apparatus. A first vehicle-mounted device in a first vehicle may generate, based on first position information, first-level information indicating a first height level to which a position or a future driving track of the first vehicle belongs, and send the first-level information, to notify another vehicle of the first height level at which the vehicle is currently or is about to be located. In this way, in a multi-level road scenario, when the elevation data cannot be expressed or the elevation data cannot be directly transmitted, the first-level information is used as reference height data. It is convenient for another vehicle to predict a danger in advance based on the first-level information, and then determine whether processing such as vehicle avoidance needs to be performed, so as to avoid misoperations caused by a lack of the interactive elevation data of the vehicles at different height levels. The method and the apparatus are based on a same technical idea. Because a problem-resolving principle of the method is similar to a problem-resolving principle of the apparatus, mutual reference may be made to implementations of the apparatus and the method. Repeated parts are not described in detail.

The following describes in detail embodiments of this application with reference to the accompanying drawings.

Figure 3:
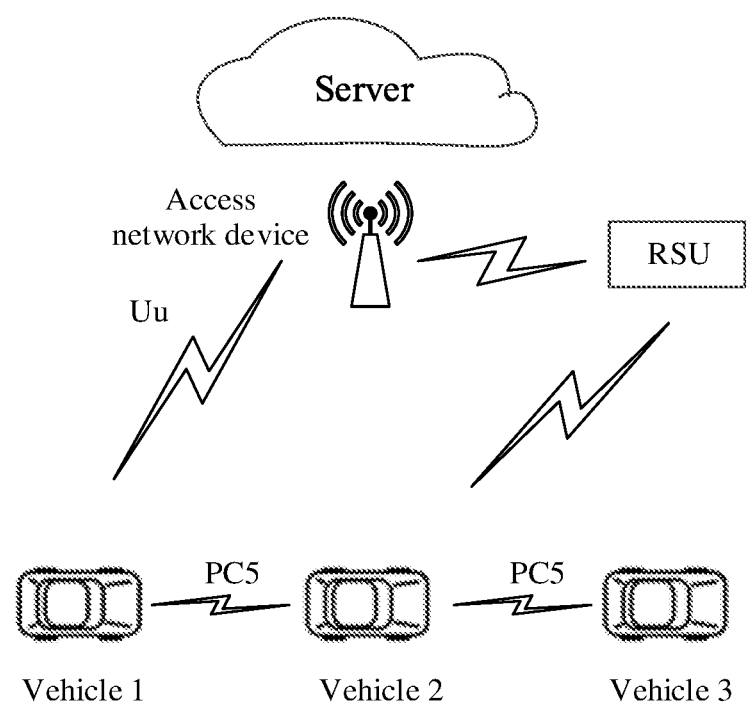
FIG. 3 is a schematic diagram of a vehicle-to-everything system according to an embodiment of this application.

FIG. 3 is a schematic diagram of a vehicle to everything system according to an embodiment of this application. Refer to FIG. 3. The vehicle-to-everything system may include at least two communication devices. For example, any one of the at least two communication devices may be a vehicle-mounted device in a vehicle, for example, a first vehicle-mounted device in a first vehicle or a second vehicle-mounted device in a second vehicle.

As shown in FIG. 3, optionally, in addition to the vehicle-mounted device, the vehicle-to-everything system may further include at least one type of the following communication devices: an RSU, user equipment, and the like. The RSU may be configured to send a V2X message to the vehicle-mounted device in a communication manner of direct communication (PC5) or dedicated short range communication (dedicated short range communication, DSRC). For example, the V2X message may carry road level indication information, map (map) feature information, or other information that needs to be notified to the vehicle-mounted device. The communication manner between the RSU and the vehicle-mounted device may be referred to as vehicle to infrastructure (vehicle to infrastructure, V2I) communication. A specific deployment form of the road side unit is not specifically limited in this application. The road side unit may be a vehicle-to-everything terminal, a mobile or non-mobile terminal device, a server, a chip, or the like. The user equipment may be, for example, a mobile phone, and may be configured to communicate with the vehicle-mounted device in a wireless communication manner (for example, Bluetooth or Wi-Fi), and send, to the vehicle-mounted device, the road level indication information, the map (map) feature information, or other information that needs to be notified to the vehicle-mounted device.

For example, in this embodiment of this application, the vehicle-to-everything system may include a server. The server may be a vehicle-to-everything platform or server that manages a vehicle-mounted device and/or an RSU, and the vehicle-to-everything server may be referred to as a server for short subsequently. A specific deployment form of the vehicle-to-everything server is not limited in this application. The vehicle-to-everything server may be specifically deployed on a cloud, or may be an independent computer device, a chip, or the like. When the V2X message needs to be sent to the vehicle-mounted device, the vehicle-to-everything server may send the V2X message to the RSU, and the RSU broadcasts the V2X message to the vehicle-mounted device in a coverage area of the RSU.

Based on the vehicle-to-everything system, the vehicle-to-everything server may communicate with a plurality of RSUs deployed on a roadside of a road (where the road may include one or more lanes). Each RSU may send a V2X message to the vehicle-mounted device within a coverage area of the RSU. Coverage areas of the plurality of RSUs may overlap. Different vehicle-mounted devices may also exchange V2X messages with each other, to notify a peer end of an identity of the vehicle-mounted device or other information that needs to be notified to the peer vehicle-mounted device, so that the peer vehicle-mounted device performs corresponding processing based on the received related information.

Optionally, in this embodiment of this application, the vehicle-to-everything system may further include a height sensor. The height sensor may be disposed on a road, or may be integrated into the vehicle-mounted device, or integrated into the vehicle in which the vehicle-mounted device is located. The height sensor may be configured to detect an altitude of a position of the height sensor. The height sensor may communicate with the vehicle-mounted device and provide the detected height information to the vehicle-mounted device. The vehicle-mounted device may determine height coordinates of a position of the vehicle based on the height information from the height sensor, so as to determine a height level of the vehicle-mounted device based on the height coordinates. The vehicle-mounted device may send level information to another vehicle, to indicate the height level of the vehicle-mounted device, so that the another vehicle can learn of the height level. Optionally, the another vehicle may perform corresponding processing based on the received level information, for example, a safety warning, route planning, or vehicle avoidance.

For example, if the vehicle-mounted device is integrated into a vehicle driving on the road, and the vehicle is in an autonomous driving mode, the vehicle-mounted device may identify a target in an ambient environment of the vehicle-mounted device, to determine an adjustment to a current speed. The target may be another vehicle, a traffic control device, or another type of target. In some examples, each identified target may be considered independently, and a speed to be adjusted by the vehicle may be determined based on features of each target, such as a current speed of the target, acceleration of the target, and a distance between the target and the vehicle. A computing device associated with the vehicle-mounted device may predict behavior of the identified target based on the features of the identified target and a state (for example, traffic, rain, ice on the road) of the ambient environment. Optionally, all identified targets depend on behavior of each other, and therefore all the identified targets may be considered together to predict behavior of a single identified target. The vehicle-mounted device can adjust the speed of the vehicle-mounted device based on the predicted behavior of the identified target. In other words, the vehicle-mounted device can determine, based on the predicted behavior of the target, a stable (for example, accelerate, decelerate, or stop) state to which the vehicle needs to be adjusted. In this process, another factor may also be considered to determine the speed of the vehicle, for example, a horizontal position of the vehicle on a road on which the vehicle travels, curvature of the road, and proximity between a static target and a dynamic target.

In addition to providing instructions to adjust the speed of the vehicle, the vehicle-mounted device may also provide instructions to modify a steering angle of the vehicle, so that the vehicle follows a given track and/or maintains safe lateral and longitudinal distances from a target (such as a car in an adjacent lane on the road) near the vehicle. Details are not described herein again.

Figure 4:
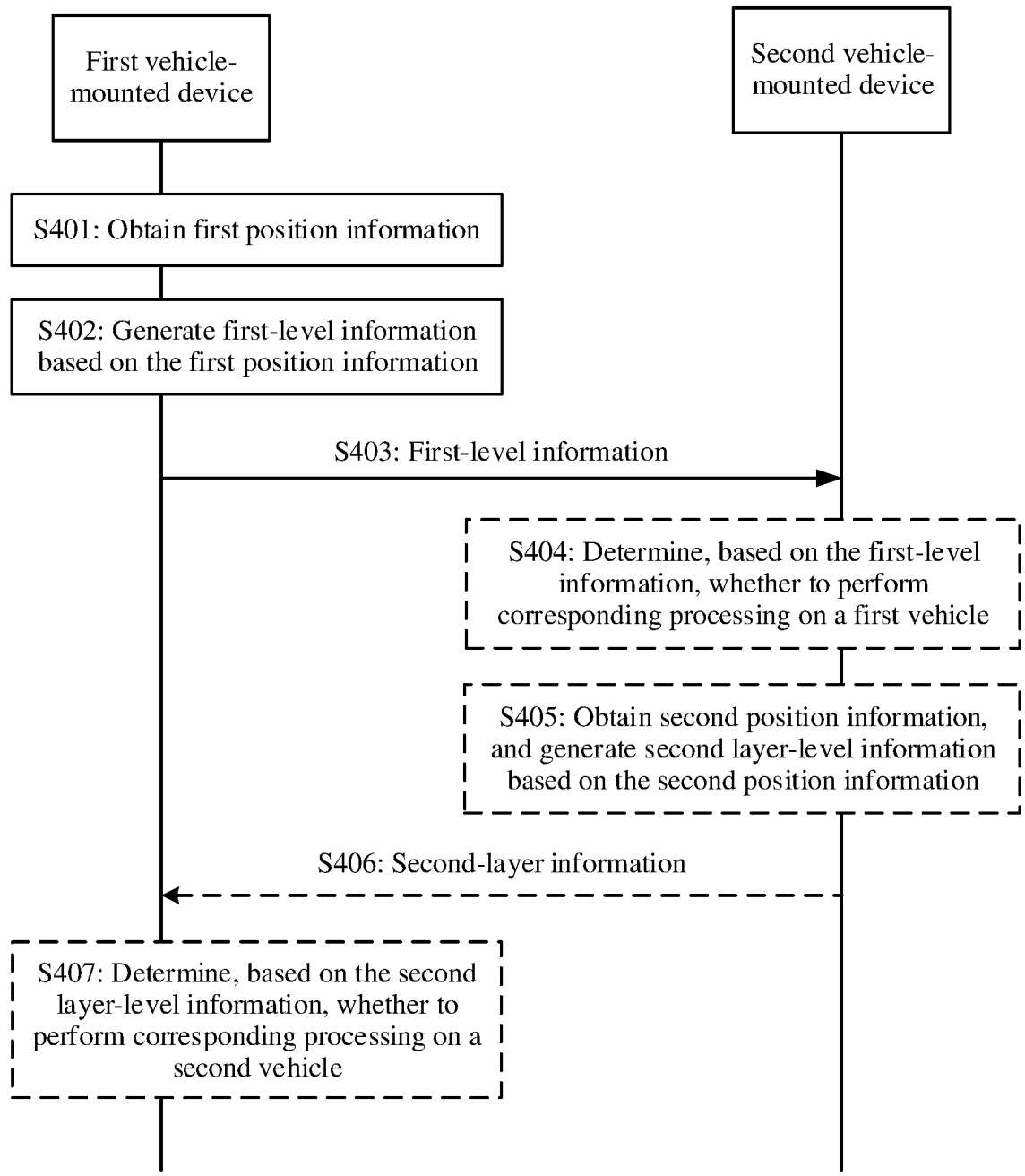
FIG. 4 is a schematic flowchart of a communication method according to an embodiment of this application.

An embodiment of this application provides a communication method. The method is applicable to the vehicle-to-everything system shown in FIG. 3. Refer to FIG. 4. The communication method may include the following steps.

S401: A first vehicle-mounted device obtains first position information.

In this embodiment of this application, the first vehicle-mounted device may be placed or installed in a first vehicle driving on a road. The first position information may indicate a position of the first vehicle, and the position may be a real-time position of the first vehicle, or may be a prediction of a future position to which the first vehicle is about to travel. It should be understood that the road may further include another communication device, for example, a second vehicle-mounted device (for example, the second vehicle-mounted device is placed or installed in a second vehicle driving on the road) or an RSU. The second vehicle-mounted device or the RSU may perform V2X communication with the first vehicle-mounted device.

The road may be a one-level road, such as a common surface road, or a single-level road erected on a lake or river or mountain or in a tunnel. Alternatively, the road may be a multi-level road shown in FIG. 1, including but not limited to a two-level road, a three-level road, a four-level road, and the like. For example, the road may be a viaduct, an overpass, or the like. For ease of description, in this application, a ground is used as a start road level (namely, a first-level road), N is used to represent a quantity of multi-level road levels, and N is an integer greater than or equal to 1. A first road level to which a position or a future driving track of the first vehicle-mounted device belongs may be denoted as an n-level road, where n=1, 2, 3, . . . , N. A greater distance between the road and the ground indicates a greater value of the road level n. It may be understood that, in this application, the N-level road may alternatively be an N-level road disposed on a lake or a river or a mountain or in a tunnel. In this case, a road with a lowest altitude is a first-level road, and a corresponding road level is a start road level. As the altitude increases, a value of the road level n gradually increases. Because the multi-level road is usually erected based on different height intervals, the road level in this application may also be referred to as a height level.

S402: The first vehicle-mounted device generates first-level information based on the first position information.

In this application, for ease of differentiation, the position of the first vehicle may be referred to as a first position. The driving track (including a real-time driving track and/or a predicted future driving track) of the first vehicle is referred to as a target driving track, and the target driving track may include the first position. A road level to which the position or the future driving track of the first vehicle belongs is referred to as a first road level, and is also referred to as a first height level. The first-level information may indicate the first height level to which the position of the first vehicle belongs, or indicate the first height level to which the future driving track of the first vehicle belongs. The first-level information may be obtained in a plurality of implementations, and the implementations are described in detail below with reference to the accompanying drawings and embodiments. Details are not described herein.

S403: The first vehicle-mounted device sends the first-level information.

Specifically, the first vehicle-mounted device may send the first-level information by sending a V2X message. In a possible manner, the first vehicle-mounted device may send the first-level information to another vehicle. In another possible manner, the first vehicle-mounted device may send the first-level information in a broadcast manner. A transmission manner of the first-level information is not limited in this application. For example, the first-level information may be a basic safety message (basic safety message, BSM).

Correspondingly, the another vehicle (for example, the second vehicle) or a vehicle-mounted device in the another vehicle may receive the first-level information from the first vehicle-mounted device, and learn, based on the first-level information, the first height level to which the position or the future driving track of the first vehicle belongs. Therefore, in a multi-level road (such as a viaduct and an overpass) scenario, when elevation data cannot be expressed or elevation data cannot be directly transmitted, the another vehicle may use the first level information as reference elevation data to make a decision. It is convenient for the another vehicle to predict a danger in advance based on the first-level information.

Optionally, in an example, the method may further include S404: The second vehicle-mounted device in the second vehicle may determine, based on the received first-level information, whether to perform corresponding processing on the first vehicle.

For example, after receiving the first-level information from the first vehicle-mounted device, and determining, by parsing the first-level information, the first height level to which the first vehicle currently belongs, the second vehicle-mounted device may compare the first height level with a second height level to which a position or a future driving track of the second vehicle belongs, to determine whether the second vehicle-mounted device needs to perform V2X communication with the first vehicle-mounted device, whether the second vehicle needs to perform avoidance on the first vehicle, or the like.

If the first height level is the same as the second height level, the second vehicle-mounted device may determine that the second vehicle and the first vehicle are located at the same height level. In this case, the position, the future driving track, or the like of the first vehicle may bring potential adverse impact on driving of the second vehicle. Therefore, information included in the V2X message sent by the first vehicle-mounted device has reference significance for the second vehicle-mounted device to make a decision (for example, a driving track prediction or a safety warning). Therefore, the second vehicle-mounted device may continue to perform V2X communication with the first vehicle-mounted device, for example, receive a V2X message from the first vehicle-mounted device, and make a decision based on exchanged information, to determine whether the second vehicle needs to perform corresponding processing such as a safety warning or vehicle avoidance, so as to avoid a traffic accident, and ensure safety of the second vehicle.

If the first height level is different from the second height level, for example, the first height level corresponds to the first-level road, and the second height level corresponds to a second-level road, the second vehicle-mounted device may determine that the second vehicle and the first vehicle belong to different height levels, that is, on roads at different levels. In this case, when the first vehicle and the second vehicle respectively drive on parallel sections or cross sections of the roads at the different levels, the second vehicle does not need to worry that the first vehicle may cause adverse impact (for example, a collision) on driving of the second vehicle. The second vehicle-mounted device may determine not to avoid the first vehicle during route planning. Optionally, because the driving track and the like of the first vehicle may not affect the driving of the second vehicle, information (for example, a vehicle warning) included in the V2X message sent by the first vehicle-mounted device has weak reference significance. Therefore, the second vehicle-mounted device may choose not to perform V2X communication with the first vehicle-mounted device. In this case, the second vehicle-mounted device may not receive a V2X message from the first vehicle-mounted device or temporarily ignore a received V2X message from the first vehicle-mounted device, to avoid a security risk caused by a series of misoperations.

It should be understood that the second vehicle-mounted device is merely used as an example herein to illustrate a purpose of the first-level information sent by the first vehicle-mounted device in this application, instead of any limitation. In another embodiment, the first vehicle-mounted device may further make a decision based on an actual situation of the first vehicle, to determine whether to send the first-level information, whether to add the first-level information to the V2X message or another message sent by the first vehicle-mounted device, or the like. Correspondingly, the second vehicle-mounted device may make a decision based on the received first-level information and an actual situation of the second vehicle, to determine whether to perform corresponding processing such as a safety warning or vehicle avoidance on the first vehicle.

It may be understood that, in this application, the second vehicle-mounted device in the second vehicle may be a device that has a same or similar function as the first vehicle-mounted device in the first vehicle. The second vehicle-mounted device may determine, in a same or similar manner as the first vehicle-mounted device, the second height level to which the position or the future driving track of the second vehicle belongs, and may notify another vehicle (for example, the first vehicle) of the second height level.

For example, as shown in FIG. 4, the communication method may further include the following steps.

S405: The second vehicle-mounted device may obtain second position information, and then generate second-level information based on the second position information, where the second-level information may indicate the second height level to which the position of the second vehicle belongs (in this application, for ease of differentiation, the position of the second vehicle may be referred to as a second position), or the second height level to which the future driving track of the second vehicle belongs.

S406: The second vehicle-mounted device may send the second-level information, where the second-level information may be received by the vehicle-mounted device in the another vehicle (for example, the first vehicle-mounted device in the first vehicle), so that the another vehicle can determine, based on the second-level information, whether to perform corresponding processing on the second vehicle, for example, whether to maintain V2X communication or whether to avoid the second vehicle.

Refer to FIG. 4. The first vehicle-mounted device is used as an example. S407: The first vehicle-mounted device receives the second-level information from the second vehicle-mounted device in the second vehicle, where the second-level information indicates the second height level to which the position of the second vehicle belongs, or indicates the second height level to which the future driving track of the second vehicle belongs. The first vehicle-mounted device may learn, by parsing the second-level information, the second height level to which the second vehicle belongs.

Optionally, the first vehicle-mounted device may further determine, based on the second-level information received from the second vehicle, whether to perform corresponding processing on the second vehicle. For example, after receiving the second-level information from the second vehicle-mounted device, and determining, by parsing the second-level information, the second height level at which the second vehicle-mounted device is currently located, the first vehicle-mounted device may compare the second height level with the first height level to which the first position or the future driving track of the first vehicle belongs, to determine whether V2X communication needs to be performed with the second vehicle-mounted device, whether avoidance needs to be performed on the second vehicle during route planning, or the like.

For example, when the first height level is the same as the second height level indicated by the second-level information, the first vehicle-mounted device may maintain V2X communication with the second vehicle-mounted device, and need to avoid the second vehicle during route planning. When the first height level is different from the second height level indicated by the second-level information, the first vehicle-mounted device may choose not to perform V2X communication with the second vehicle-mounted device. In this case, the first vehicle-mounted device may not receive a V2X message from the second vehicle-mounted device, or temporarily ignore a received V2X message from the second vehicle-mounted device. Alternatively, the first vehicle-mounted device may not avoid the second vehicle during route planning. For a detailed implementation, refer to the related description of S404. Details are not described herein again.

It should be understood that, in the communication method, S405 to S407 are merely example steps indicating that the second vehicle-mounted device may have functions of generating and sending the second-level information, and the first vehicle-mounted device may have a function of receiving the second-level information from the second vehicle, instead of any limitation on an implementation sequence or the like of the method steps. In an implementation, S405 to S407 may occur at the same time as S401 to S404, or S405 to S407 may occur before S401 to S404. Occurrence times of the steps S401 to S404 and S405 to S407 may overlap. Optionally, corresponding level information sent by the first vehicle-mounted device and/or the second vehicle-mounted device may also be received by the RSU, and the RSU may also perform corresponding processing based on the received corresponding level information, for example, reporting, to the vehicle-to-everything server, the corresponding level information sent by the first vehicle-mounted device and/or the second vehicle-mounted device, and the like. Details are not described herein again.

Therefore, by using the communication solution, the first vehicle-mounted device in the first vehicle may generate and send the first-level information based on the first position information, to indicate the first height level to which the position or the future driving track of the first vehicle belongs, so that after receiving the first-level information, the another vehicle may learn of the first height level of the first vehicle. Therefore, when elevation data cannot be expressed or cannot be directly transmitted, whether different vehicles are on a road at a same level and whether a safety risk such as a collision exists are distinguished by using interactive level information, so as to avoid misoperations caused by lack of communication information between different vehicles.

For ease of understanding, the following describes a specific implementation in which the first vehicle-mounted device generates the first-level information with reference to different embodiments. It may be understood that this manner is also applicable to the second vehicle-mounted device generating the second-level information. Details are not described in the following. Example 1: The first vehicle-mounted device generates the first-level information based on map information.

The map information may be received by the first vehicle-mounted device from the RSU. The map information may indicate a road level to which the RSU belongs, or may indicate a map feature such as a road point, a road section, or a lane in a coverage area of the RSU.

Figure 5:
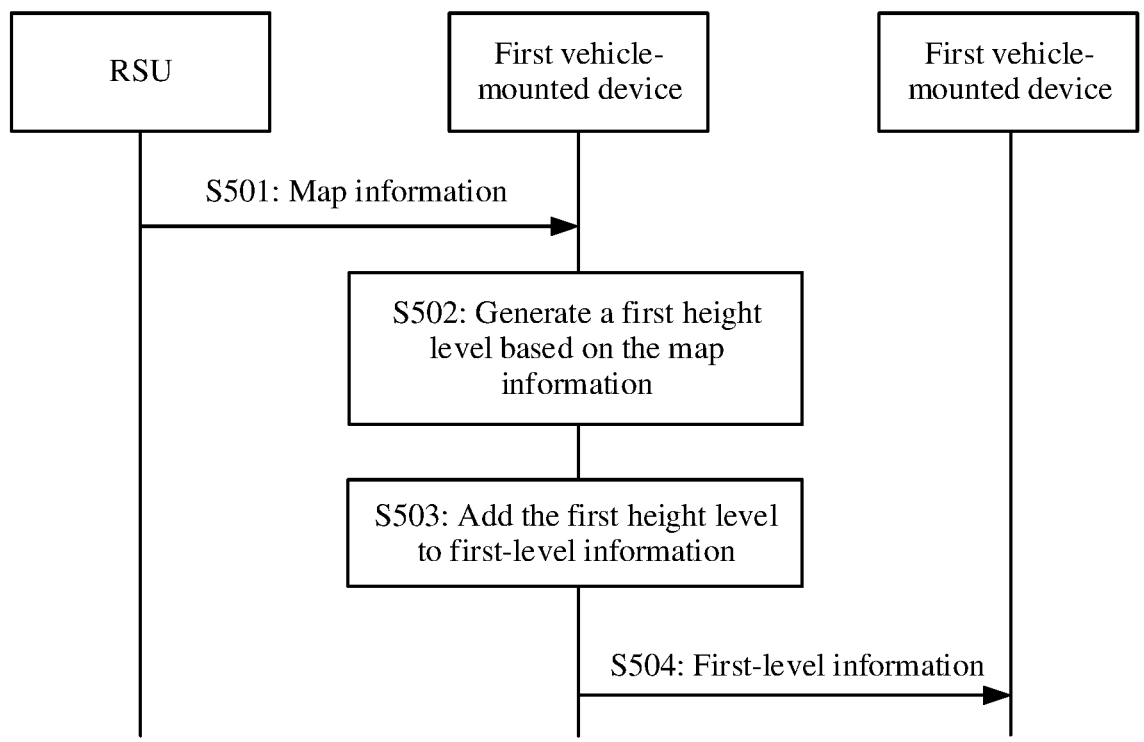
FIG. 5 is a schematic flowchart of a communication method according to an embodiment of this application.

As shown in FIG. 5, the communication method may include the following steps.

S501: An RSU sends a V2X message in a broadcast manner, where the V2X message may include map information, for example, a road level identifier, a road point identifier, a road section identifier, or a lane identifier. The road level identifier may indicate a road level to which the RSU belongs, the road point identifier may indicate a road point on which the RSU is located, the road section identifier may indicate a road section on which the RSU is located, and the lane identifier may indicate a lane on which the RSU is located. Alternatively, the road point identifier, the road section identifier, or the lane identifier may separately indicate a specific road point, a road section, or a lane in a coverage area of the RSU.

Correspondingly, after driving into the coverage area of the RSU, the first vehicle-mounted device may receive map information such as the road level identifier, the road point identifier, the road section identifier, or the lane identifier from the RSU. The first position information may include at least one of the map information.

S502: The first vehicle-mounted device generates a first height level based on the map information.

S503: The first vehicle-mounted device adds the first height level to first-level information. For example, the first-level information may be a BSM message.

S504: The first vehicle-mounted device sends the first-level information.

During implementation, S502 and S503 may be implemented in a plurality of manners. A BSM message is used as an example, and the S504 may include the following examples.

Example 1-1: The first vehicle-mounted device directly uses at least one of map information such as a road level identifier, a road point identifier, a road section identifier, or a lane identifier that is received from the RSU as the first height level, and adds the first height level to the BSM message.

Example 1-2: The first vehicle-mounted device may generate the first height level after processing (for example, information conversion processing) at least one of received map information such as a road level identifier, a road point identifier, a road section identifier, or a lane identifier, and add the first height level to the BSM message.

It may be understood that, in this application, the first height level may be carried in a preset field in the BSM message, and the preset field may be an original field in the BSM message, for example, a field used to carry position information. Alternatively, the preset field may be an extended field that is in the BSM message and that is used to carry the first height level. This is not limited in specific implementation in this application.

For the foregoing example 1-2, during implementation, the first vehicle-mounted device may obtain first-level configuration information, where the first-level configuration information indicates a correspondence between map information and a height level. Then, the first vehicle-mounted device may determine the first height level based on the received map information and the first level configuration information.

As shown in Table 1, the first-level configuration information may include a correspondence between each height level and a corresponding road level identifier, a road point identifier, a road section identifier, a lane identifier, and the like.

TABLE 1

| Height level N | Map information |
| --- | --- |
| Layer 1 | Road level identifier 1 |
| Layer 1 | Road point 1 |
| Layer 1 | Road section 1 |
| Layer 1 | Lane 1 |
| Layer 2 | Road level identifier 2 |
| Layer 2 | Road point 2 |
| Layer 2 | Road section 2 |
| Layer 2 | Lane 2 |
| ... | ... |

When S502 is implemented, the first vehicle-mounted device determines, based on the map information received from the RSU and the correspondence shown in Table 1, the first height level corresponding to the map information, and then adds the first height level to the BSM message.

It may be understood that the first vehicle-mounted device may locally store the first-level configuration information, or the first vehicle-mounted device may obtain the first-level configuration information from a cloud or another storage device, and the first-level configuration information may be updated with map data of an electronic map. This is not limited in this application.

Example 2: The first vehicle-mounted device generates the first-level information based on height coordinates of the position of the first vehicle.

In this example, various detection apparatuses used for positioning or measurement may be configured in the first vehicle, for example, a vehicle positioning system (vehicle positioning system) used for vehicle positioning, a height sensor used for measuring altitude, or a barometric pressure sensor. By obtaining a detection result of each detection apparatus, the first vehicle-mounted device may learn of the height coordinates of the current position of the first vehicle, and then the first vehicle-mounted device may generate the first-level information based on the height coordinates.

Figure 6:
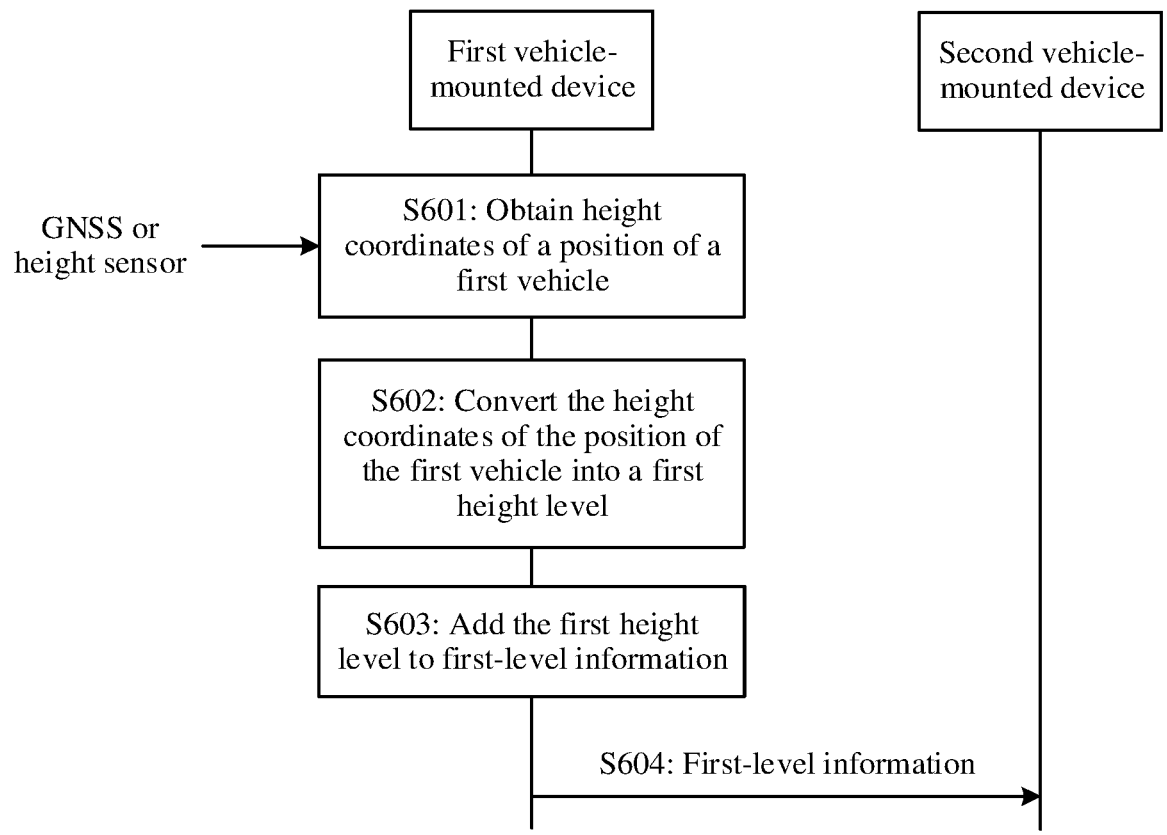
FIG. 6 is a schematic flowchart of a communication method according to an embodiment of this application.

As shown in FIG. 6, the communication method may include the following steps.

S601: A first vehicle-mounted device obtains height coordinates of a position of a first vehicle.

During implementation, the first vehicle-mounted device may obtain the height coordinates of the position of the first vehicle in a plurality of manners.

Example 2-1: A vehicle positioning system in the first vehicle may include a global navigation satellite system (global navigation satellite system, GNSS) and a geographic information system (geographic information system, GIS), to implement tracking and positioning of the first vehicle. The first vehicle-mounted device may obtain, by using the GNSS, first position information of a first position at which the first vehicle is currently located. The first position information may include longitude and latitude information and height coordinates (namely, elevation data) corresponding to the first position of the first vehicle. The first position information may be represented as (x, y, z), to represent a spatial position corresponding to the first position. Herein, x may represent longitude coordinates, y may represent latitude coordinates, and z may represent height coordinates.

Example 2-2: A height sensor may be configured in the first vehicle, and the height sensor may be configured to measure the height coordinates of the position of the first vehicle in real time. The first vehicle-mounted device may communicate with the height sensor, and obtain the height coordinates from the height sensor.

Due to confidentiality of national elevation information, the obtained elevation data cannot be represented by the GIS or directly sent by using a V2X message, and a limited height of each type of road is usually specified in related road facility deployment specifications. Therefore, in order to protect the elevation data, the first vehicle-mounted device can notify another vehicle of the actual road level to which the first vehicle currently belongs. A possible manner is as follows.

S602: The first vehicle-mounted device converts the height coordinates of the position of the first vehicle into a first height level.

S603: The first vehicle-mounted device adds the first height level to first-level information.

S604: The first vehicle-mounted device sends the first-level information.

When S602 is implemented, the first vehicle-mounted device may obtain second-level configuration information, where the second-level configuration information indicates a correspondence between a height interval and a height level. After obtaining the height coordinates of the first position, the first vehicle-mounted device may determine a height interval to which the height coordinates belong. Then, the first vehicle-mounted device may determine, based on the second-level configuration information, the first height level corresponding to the height coordinates, that is, complete conversion from the height coordinates to the height level.

Specifically, as shown in Table 2, the second-level configuration information may indicate different height intervals, and any height interval corresponds to one height level, for example, {0 to X m, first level}, {X to 2X m, second level}, {2X to 3X m, third level}, . . . , and {n−1X to nX m, N level}. Based on the second-level configuration information, the first vehicle-mounted device may convert the height coordinates obtained by using the GNSS, the height sensor, or the RSU into the height level, and generate the first-level information (or a part of the first-level information) based on the obtained height level.

TABLE 2

| Height level N | Height range (Unit: m) |
| --- | --- |
| Layer 1 | 0 to X m |
| Layer 2 | X to 2X m |
| Layer 3 | 2X to 3X m |
| ... | ... |

It may be understood that the first vehicle-mounted device may locally store the second-level configuration information, or the first vehicle-mounted device may obtain the second-level configuration information from a cloud or another storage device. This is not limited in this application. X may have any proper value in the set second-layer configuration information. This is not limited in this application. For example, according to China's road facility deployment specifications, a net height of an expressway, a first grade highway, and a secondary highway is generally 5 m. A net height of a tertiary highway and a township road is generally 4.5 m. A height limit of a viaduct and an overpass is generally between 2.8 m and 3.6 m. A height limit of a highway and railway combined bridge is generally between 3.5 m and 4.5 m. Therefore, to meet a minimum coverage requirement, X may be generally set to 3 m in this application. It should be understood that, because different countries, regions, and the like have different specifications for road facility deployment, the second-level configuration information obtained by the first vehicle-mounted device or a value of X in the second-level configuration information may be adaptively updated based on different countries, regions, and the like in which the vehicle is actually located. For example, X is set to 4 m according to the road facility deployment specifications in some countries or regions.

It may be understood that in the second-level configuration information, "0" generally corresponds to a first-level road in the multi-level road, for example, a land surface. During implementation 602, the first vehicle-mounted device may use a ground on which the first position is currently located as a height origin, perform a difference between altitude information obtained by using the GNSS or the height sensor and altitude information corresponding to the ground, obtain height coordinates corresponding to the first position in which the first vehicle is currently located, and further determine the first height level based on the height coordinates. It should be noted that topographical differences in different countries or regions, for example, some regions are plains, some regions are plateaus, some regions are basins, some regions include both plains and plateaus, some regions include both plains and basins, some multi-level roads are directly disposed on the land ground, and some multi-level roads are suspended on lakes, rivers, mountains, and the like. Therefore, when obtaining the height coordinates of the first position by using the GNSS or the height sensor, for example, the first vehicle-mounted device may set a height origin used as a reference (for example, the same as an altitude of the ground corresponding to the first position, or the same as an altitude corresponding to the first-level road) with reference to terrain information actually corresponding to the first position, to obtain a more accurate height level. In a running process of the first vehicle-mounted device, the height origin may also be updated in real time with a change of terrain in a driving track of the vehicle. Details are not described herein again.

Example 3: The first vehicle-mounted device generates the first-level information based on longitude and latitude information of the position of the first vehicle.

In this example, the first position information obtained by the first vehicle-mounted device may include longitude and latitude information of the position of the first vehicle, and the first vehicle-mounted device may generate the first-level information based on the longitude and latitude information.

Figure 7:
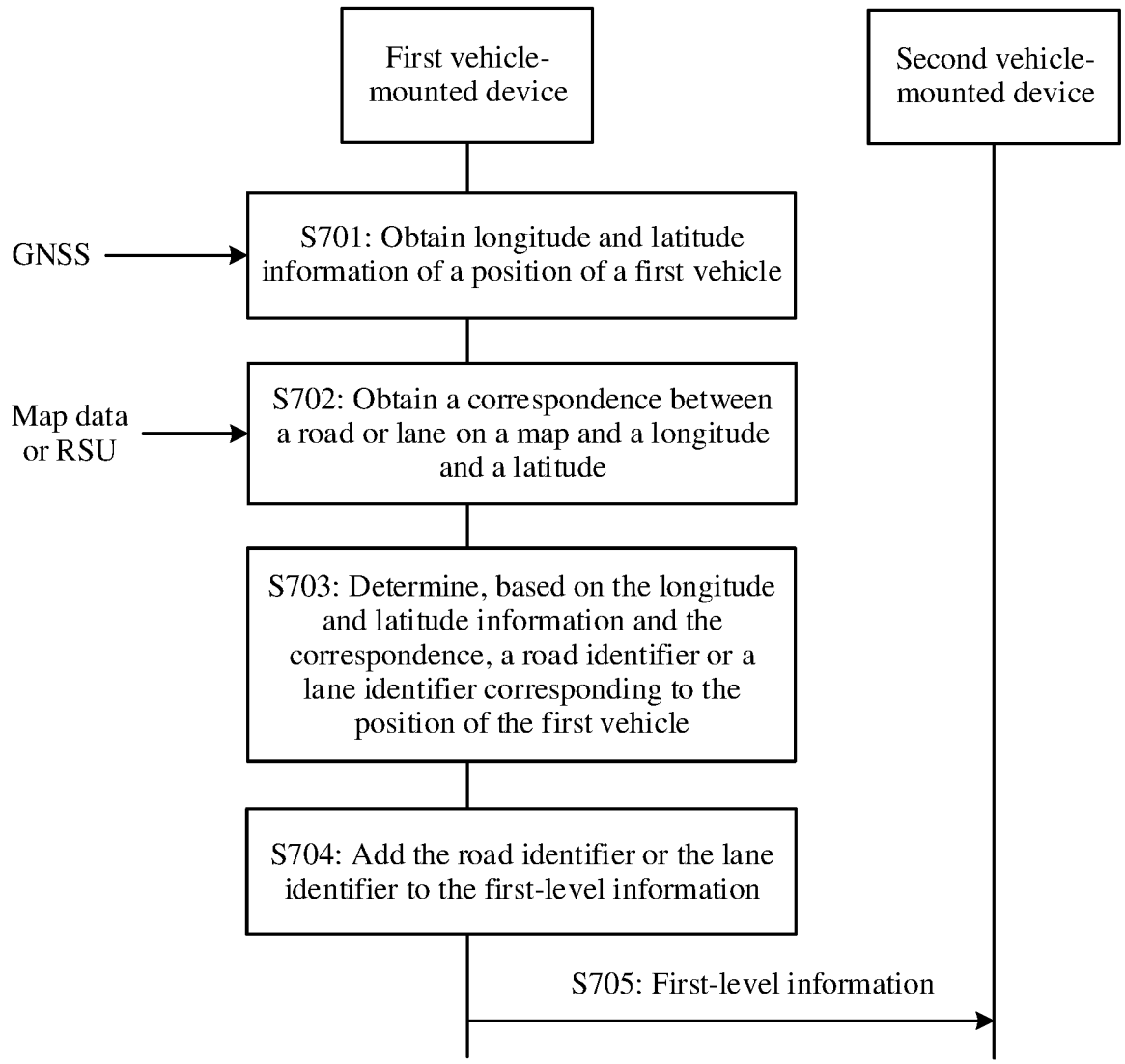
FIG. 7 is a schematic flowchart of a communication method according to an embodiment of this application.

As shown in FIG. 7, the communication method may include the following steps.

S701: A first vehicle-mounted device obtains longitude and latitude information of a position of a first vehicle.

For example, the first vehicle may be configured with a vehicle positioning apparatus or system, for example, a GNSS, a GPS, a BDS, or a GLONASS, and the first vehicle-mounted device may obtain the longitude and latitude information of the position of the first vehicle by using the GNSS, GPS, BDS, or GLONASS.

S702: The first vehicle-mounted device obtains a correspondence between a road or a lane on a map and a longitude and a latitude.

For example, the first vehicle-mounted device may receive the correspondence from an RSU. Alternatively, the first vehicle-mounted device may obtain the correspondence by using map data that is of the first vehicle and that is used for navigation. Alternatively, the first vehicle-mounted device may obtain the correspondence in another manner.

S703: The first vehicle-mounted device determines, based on the longitude and latitude information and the correspondence, a road identifier or a lane identifier corresponding to the position of the first vehicle.

In an example, the correspondence between a road or a lane and a longitude and a latitude may be implemented as third-layer configuration information shown in Table 3. The third-layer configuration information indicates a correspondence between map information (for example, the road or the lane on the map) and a longitude and a latitude. When S702 is implemented, the first vehicle-mounted device may determine, based on the longitude and latitude information of the position of the first vehicle and the third layer-level configuration information, a road identifier or a lane identifier corresponding to the position of the first vehicle. It may be understood that the correspondence may alternatively be a correspondence between a road or a lane and a longitude and latitude interval. The first vehicle-mounted device may determine, based on the longitude and latitude information of the position of the first vehicle, a longitude and latitude interval to which the position of the first vehicle belongs, and then determine, based on the third layer-level configuration information, a road identifier or a lane identifier corresponding to the position of the first vehicle.

TABLE 3

| Map information | Longitude and latitude (interval) |
|---|---|
| Road 1 | (x1, y1) |
| Lane 1 | |
| Road 2 | (x2, y2) |
| Lane 2 | |
| . . . | . . . |

S704: The first vehicle-mounted device adds the road identifier or the lane identifier to the first-level information.

S705: The first vehicle-mounted device sends the first-level information.

Optionally, when S702 is implemented, in another example, the first vehicle-mounted device may obtain first-level configuration information shown in Table 1 and second-level configuration information shown in Table 2. The first-level configuration information indicates a correspondence between map information and a height level. The second-level configuration information indicates a correspondence between a height interval and a height level. Then, the first vehicle-mounted device may determine, based on the first-level configuration information, that the height level corresponding to the map information is the first candidate height level, and determine, based on the second-level configuration information, that the height level information corresponding to the height coordinates is the second candidate height level. When the first candidate height level and the second candidate height level are the same, the first vehicle-mounted device determines that the first candidate height level and the second candidate height level are the first height level. When the first candidate height level is different from the second candidate height level, the first vehicle-mounted device determines the first candidate height level or the second candidate height level are the first height level.

So far, a manner of generating the first-level information in this application has been described in detail with reference to FIG. 5 to FIG. 7 and the embodiments. According to this solution, the first vehicle-mounted device may generate and send the first-level information indicating the first height level, so that another vehicle (for example, a second vehicle) can learn, after receiving the first-level information, the first height level to which the first vehicle currently belongs or is about to belong. Therefore, in a multi-level road (such as a viaduct and an overpass) scenario, when elevation data cannot be expressed or elevation data cannot be directly transmitted, level information may be used as reference elevation data and transmitted between different vehicles. It is convenient for another vehicle to predict a danger in advance based on the first-level information, and further determine whether processing such as vehicle avoidance needs to be performed, so as to avoid safety risks caused by misoperations between vehicles at different height levels.

Figure 8:
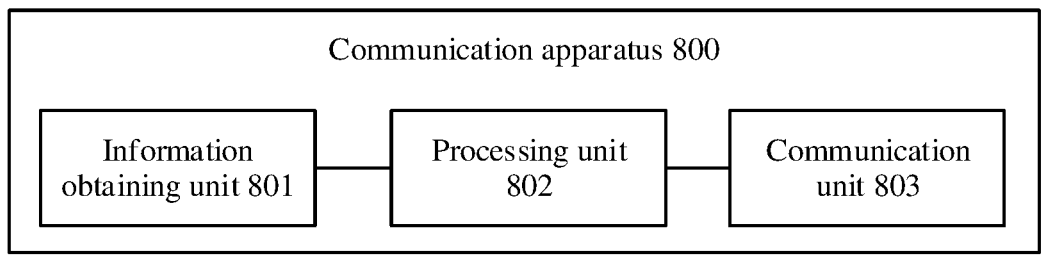
FIG. 8 is a schematic diagram of a communication apparatus according to an embodiment of this application.

Based on a same technical concept, refer to FIG. 8. This application further provides a communication apparatus 800, and the communication apparatus 800 may include an information obtaining unit 801 and a processing unit 802. The communication apparatus 800 may be applied to the first vehicle-mounted device in the first vehicle, the second vehicle-mounted device in the second vehicle, and the like described in the foregoing method. This is not limited herein.

For example, the communication apparatus may be applied to a first vehicle-mounted device, and the information obtaining unit 801 is configured to obtain first position information, where the first position information indicates a position of the first vehicle. The processing unit 802 is configured to generate first-level information based on first position information, where the first-level information indicates a first height level to which the position of the first vehicle belongs, or indicates a first height level to which a future driving track of the first vehicle belongs. The communication unit 803 is configured to send the first-level information.

For example, the first position information includes at least one of the following map information: road level indication information, a road point identifier, a road section identifier, or a lane identifier.

For example, the processing unit 802 is configured to generate the first height level based on the map information; and add the first height level to the first-level information.

For example, the information obtaining unit 801 is configured to receive the first position information from a road side unit by using the communication unit.

For example, the first position information includes height coordinates of the position of the first vehicle. The processing unit 802 is specifically configured to convert the height coordinates into the first height level; and add the first height level to the first-level information.

For example, the information obtaining unit 801 is configured to obtain the height coordinates by using a global navigation satellite system GNSS or a height sensor.

For example, the first position information includes longitude and latitude information of the position of the first vehicle. The information obtaining unit 801 is further configured to obtain a correspondence between a road or a lane on a map and a longitude and a latitude. The processing unit 802 is specifically configured to determine, based on the longitude and latitude information and the correspondence, a road identifier or a lane identifier corresponding to the position of the first vehicle; and add the road identifier or the lane identifier to the first-level information.

For example, the communication unit 803 is configured to send the first-level information to another vehicle; and send the first-level information in a broadcast manner.

For example, the first-level information is a basic safety message BSM.

For example, the communication unit 803 is further configured to receive second-level information from a second vehicle, where the second-level information indicates a second height level to which a position of the second vehicle belongs, or indicates a second height level to which a future driving track of the second vehicle belongs; and when the first height level is different from the second height level, determine not to avoid the second vehicle during route planning.

Figure 9:
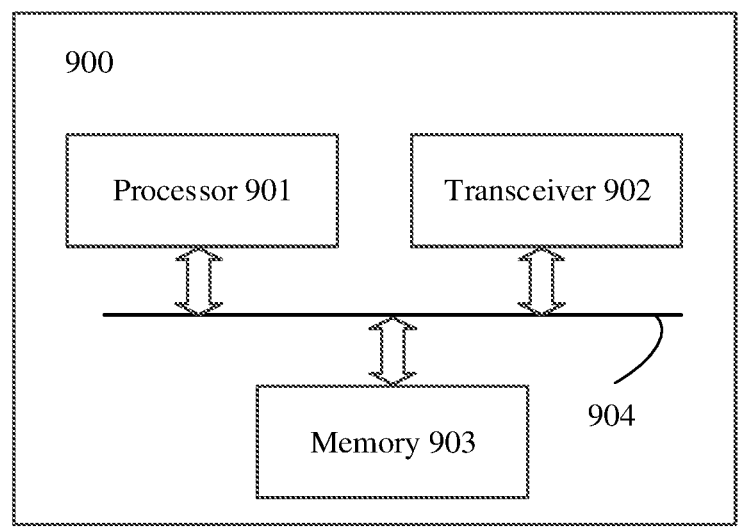
FIG. 9 is a schematic diagram of a communication device according to an embodiment of this application.

With reference to the foregoing concept, as shown in FIG. 9, an embodiment of this application further provides a communication device 900. The communication device may be applied to a first vehicle-mounted device in a first vehicle, a second vehicle-mounted device in a second vehicle, and the like described in the foregoing method. This is not limited herein.

The communication device 900 may include a processor 901 and a transceiver 902. Optionally, the communication device 900 may further include a memory 903, and further optionally, the communication device 900 may further include a bus system 904.

For example, the processor 901, the transceiver 902, and the memory 903 are connected by using the bus system 904, the memory 903 is configured to store instructions, and the processor 901 is configured to execute the instructions stored in the memory 903, to control the transceiver 902 to perform communication, and complete the steps implemented by the first vehicle-mounted device in the foregoing method. The transceiver 902 may be a physical entity, or the transceiver 902 may include a receiver and a transmitter, and the receiver and the transmitter may be disposed in different physical entities. The memory 903 may be integrated into the processor 901, or may be disposed separately from the processor 901.

In an implementation, it may be considered that a function of the transceiver 902 is implemented by using a transceiver circuit or a dedicated transceiver chip. It may be considered that the processor 901 is implemented by using a dedicated processing chip, a processing circuit, a processor, or a universal chip.

In another implementation, a general-purpose computer may be considered to implement the first vehicle-mounted device and the second vehicle-mounted device provided in the embodiments of this application. To be specific, program code for implementing functions of the processor 901 and the transceiver 902 is stored in the memory 903, and a general-purpose processor implements functions of the processor 901 and the transceiver 902 by executing the code in the memory.

For concepts, explanations, detailed descriptions, and other steps of the apparatus that are related to the technical solution provided in this embodiment of the present application, refer to the descriptions about the content in the foregoing method or in another embodiment. Details are not described herein again.

In an example, the communication apparatus 900 may be applied to a first vehicle-mounted device. The processor 901 may obtain first position information, where the first position information indicates a position of the first vehicle, and generate first-level information based on the first position information, where the first-level information indicates a first height level to which the position of the first vehicle belongs, or indicates a first height level to which a future driving track of the first vehicle belongs. The transceiver 902 may send the first-level information.

For example, the first position information includes at least one of the following map information: road level indication information, a road point identifier, a road section identifier, or a lane identifier.

For example, the processor 901 is specifically configured to generate the first height level based on the map information, and add the first height level to the first-level information.

For example, the transceiver 902 is configured to receive the first position information from a road side unit.

For example, the first position information includes height coordinates of the position of the first vehicle. The processor 901 is specifically configured to convert the height coordinates into the first height level; and add the first height level to the first-level information.

For example, the processor 901 is configured to obtain the height coordinates by using a global navigation satellite system GNSS or a height sensor.

For example, the first position information includes longitude and latitude information of the position of the first vehicle. The processor 901 is further configured to obtain a correspondence between a road or a lane on a map and a longitude and a latitude. Generating the first-level information based on the first position information includes: determining, based on the longitude and latitude information and the correspondence, a road identifier or a lane identifier corresponding to the position of the first vehicle; and adding the road identifier or the lane identifier to the first-level information.

For example, the transceiver 902 is configured to send the first-level information to another vehicle; and send the first-level information in a broadcast manner.

For example, the first-level information is a basic safety message BSM.

For example, the transceiver 902 is further configured to receive second-level information from a second vehicle, where the second-level information indicates a second height level to which a position of the second vehicle belongs, or indicates a second height level to which a future driving track of the second vehicle belongs; and when the first height level is different from the second height level, determine not to avoid the second vehicle during route planning.

Based on the foregoing embodiments, an embodiment of this application further provides a computer storage medium. The storage medium stores a software program. When read and executed by one or more processors, the method provided in any one or more of the foregoing embodiments may be implemented. The computer storage medium may include: any medium that can store program code, such as a removable hard disk, a read-only memory, a random access memory, a magnetic disk, or an optical disc.

Based on the foregoing embodiments, an embodiment of this application further provides a chip. The chip includes a processor, configured to implement a function in any one or more of the foregoing embodiments, for example, obtain or process information or a message in the foregoing method.

Optionally, the chip further includes a memory. The memory is configured to store a related program instruction and related data that are executed by the processor. The chip may include a chip, or may include a chip and another discrete device.

It should be understood that in the embodiment of the present application, the processor may be a central processing unit (Central Processing Unit, "CPU" for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory may include a read-only memory and a random access memory, and provide an instruction and data to the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logical circuit in the processor, or by using instructions in a form of software. The steps of the method disclosed with reference to embodiments of the present application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

In embodiments of this application, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists. A and B each may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

What is claimed is:

1. A vehicle-mounted device in a first vehicle, comprising at least one processor and at least one memory, wherein the at least one memory stores program instructions for execution by the at least one processor to:

obtain first position information, wherein the first position information indicates a position of the first vehicle;

generate first-level information based on the first position information, wherein the first-level information indicates a first height level to which the position of the first vehicle belongs or a first height level to which a future driving track of the first vehicle belongs; and send the first-level information, wherein the first-level information is used by a second vehicle-mounted device in a second vehicle to determine whether to perform vehicle-to-everything (V2X) communication with the vehicle-mounted device.

2. The vehicle-mounted device according to claim 1, wherein the first position information comprises at least one piece of the following map information:
   road level indication information, a road point identifier, a road section identifier, or a lane identifier.

3. The vehicle-mounted device according to claim 2, wherein the at least one processor is coupled to the at least one memory to execute the instructions to:
   generate the first height level based on the map information; and
   add the first height level to the first-level information.

4. The vehicle-mounted device according to claim 2, wherein the at least one processor is coupled to the at least one memory to execute the instructions to:
   receive the first position information from a road side unit.

5. The vehicle-mounted device according to claim 1, wherein the first position information comprises height coordinates of the position of the first vehicle, and the at least one processor is coupled to the at least one memory to execute the instructions to:
   convert the height coordinates into the first height level; and
   add the first height level to the first-level information.

6. The vehicle-mounted device according to claim 5, wherein the at least one processor is coupled to the at least one memory to execute the instructions to:
   obtain the height coordinates by using a global navigation satellite system (GNSS) or a height sensor.

7. The vehicle-mounted device according to claim 1, wherein the first position information comprises longitude and latitude information of the position of the first vehicle, and the at least one processor is coupled to the at least one memory to execute the instructions to:
   obtain a correspondence between a road or a lane on a map and longitude and latitude;
   determine, based on the longitude and latitude information and the correspondence, a road identifier or a lane identifier corresponding to the position of the first vehicle; and
   add the road identifier or the lane identifier to the first-level information.

8. The vehicle-mounted device according to claim 1, wherein the at least one processor is coupled to the at least one memory to execute the instructions to:
   send the first-level information to the second vehicle; or
   broadcast the first-level information.

9. The vehicle-mounted device according to claim 1, wherein the first-level information is a basic safety message (BSM).

10. The vehicle-mounted device according to claim 1, wherein the at least one processor is coupled to the at least one memory to execute the instructions to:
    receive second-level information from the second vehicle, wherein the second-level information indicates a second height level to which a position of the second vehicle belongs or a second height level to which a future driving track of the second vehicle belongs; and
    when the first height level is different from the second height level, determine not to avoid the second vehicle during route planning.

11. A communication method, applied to a vehicle-mounted device in a first vehicle, wherein the method comprises:
    obtaining first position information, wherein the first position information indicates a position of the first vehicle;
    generating first-level information based on the first position information, wherein the first-level information indicates a first height level to which the position of the first vehicle belongs or a first height level to which a future driving track of the first vehicle belongs; and
    sending the first-level information, wherein the first-level information is used by a second vehicle-mounted device in a second vehicle to determine whether to perform vehicle-to-everything (V2X) communication with the vehicle-mounted device.

12. The method according to claim 11, wherein the first position information comprises at least one piece of the following map information:
    road level indication information, a road point identifier, a road section identifier, or a lane identifier.

13. The method according to claim 12, wherein the generating first-level information based on the first position information comprises:
    generating the first height level based on the map information; and
    adding the first height level to the first-level information.

14. The method according to claim 12, wherein the obtaining first position information comprises:
    receiving the first position information from a road side unit.

15. The method according to claim 11, wherein the first position information comprises height coordinates of the position of the first vehicle, and the generating first-level information based on the first position information comprises:
    converting the height coordinates into the first height level; and
    adding the first height level to the first-level information.

16. The method according to claim 15, wherein the obtaining first position information comprises:
    obtaining the height coordinates by using a global navigation satellite system (GNSS) or a height sensor.

17. The method according to claim 11, wherein:
    the first position information comprises longitude and latitude information of the position of the first vehicle;
    the method further comprises obtaining a correspondence between a road or a lane on a map and longitude and latitude; and
    the generating first-level information based on the first position information comprises:
       determining, based on the longitude and latitude information and the correspondence, a road identifier or a lane identifier corresponding to the position of the first vehicle; and
       adding the road identifier or the lane identifier to the first-level information.

18. The method according to claim 11, wherein the sending the first-level information comprises:
    sending the first-level information to the second vehicle; or
    broadcasting the first-level information.

19. The method according to claim 11, wherein the first-level information is a basic safety message (BSM).

20. The method according to claim 11, wherein the method further comprises:

receiving second-level information from the second vehicle, wherein the second-level information indicates a second height level to which a position of the second vehicle belongs or a second height level to which a future driving track of the second vehicle belongs; and when the first height level is different from the second height level, determining not to avoid the second vehicle during route planning.

\* \* \* \* \*